US006989993B2

(12) United States Patent
Amari et al.

(10) Patent No.: US 6,989,993 B2
(45) Date of Patent: Jan. 24, 2006

(54) AUDIO RACK FOR A VEHICLE

(75) Inventors: Takeyuki Amari, Shizuoka-ken (JP); Yoshiyuki Furuya, Shizuoka-ken (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 09/964,536

(22) Filed: Sep. 28, 2001

(65) Prior Publication Data

US 2002/0008965 A1 Jan. 24, 2002

Related U.S. Application Data

(63) Continuation of application No. 09/366,722, filed on Aug. 4, 1999.

(30) Foreign Application Priority Data

Aug. 5, 1998 (JP) .............................. P 10-221775

(51) Int. Cl.
*H05K 5/00* (2006.01)
(52) U.S. Cl. ...................... 361/752; 361/800; 361/797
(58) Field of Classification Search ................ 361/730, 361/752–753, 751, 801, 802, 800, 724, 714, 361/816, 797, 796, 814, 756, 741; 174/35 R, 174/51 R; 220/812; 312/9.1, 223.1, 7.1; 455/347

See application file for complete search history.

(56) References Cited

U.S. PATENT DOCUMENTS

| | | | | |
|---|---|---|---|---|
| 4,726,789 A | * | 2/1988 | Yaffe | ........................... 439/567 |
| 4,742,978 A | * | 5/1988 | Ponticelli | ................... 248/27.1 |
| 4,807,292 A | * | 2/1989 | Sorscher | ....................... 381/86 |
| 4,868,715 A | * | 9/1989 | Putman et al. | ............. 361/814 |
| 5,199,568 A | * | 4/1993 | Streit et al. | .................. 206/443 |
| 5,233,594 A | * | 8/1993 | Wilhelm | ..................... 369/75.1 |
| 5,454,478 A | * | 10/1995 | Everson | .................. 220/23.83 |
| 5,506,563 A | * | 4/1996 | Jonic | .......................... 340/426 |
| 5,546,273 A | | 8/1996 | Harris | |
| 5,680,295 A | * | 10/1997 | Le et al. | ..................... 361/695 |
| 5,740,020 A | * | 4/1998 | Palatov | ....................... 361/796 |
| 6,040,760 A | * | 3/2000 | Kataoka et al. | .......... 340/425.5 |
| 6,097,591 A | * | 8/2000 | Ircha | .......................... 361/683 |
| 6,108,198 A | * | 8/2000 | Lin | .............................. 361/683 |
| 6,122,173 A | * | 9/2000 | Felcman et al. | ............ 361/726 |

FOREIGN PATENT DOCUMENTS

| JP | 05008663 A | | 1/1993 |
|---|---|---|---|
| JP | 09-240381 | * | 9/1997 |

\* cited by examiner

*Primary Examiner*—Randy W. Gibson
*Assistant Examiner*—Hung S. Bui
(74) *Attorney, Agent, or Firm*—Finnegan, Henderson, Farabow, Garrett & Dunner, L.L.P.

(57) ABSTRACT

An audio rack has a first and a second storage location, the first storage location accepting a first electrical equipment that has a first width size, and the second storage location being disposed below the first storage location and accepting a second electrical equipment that has a second width size that is smaller than the first width size, the width of the second storage location being smaller than that of the first storage location.

20 Claims, 6 Drawing Sheets

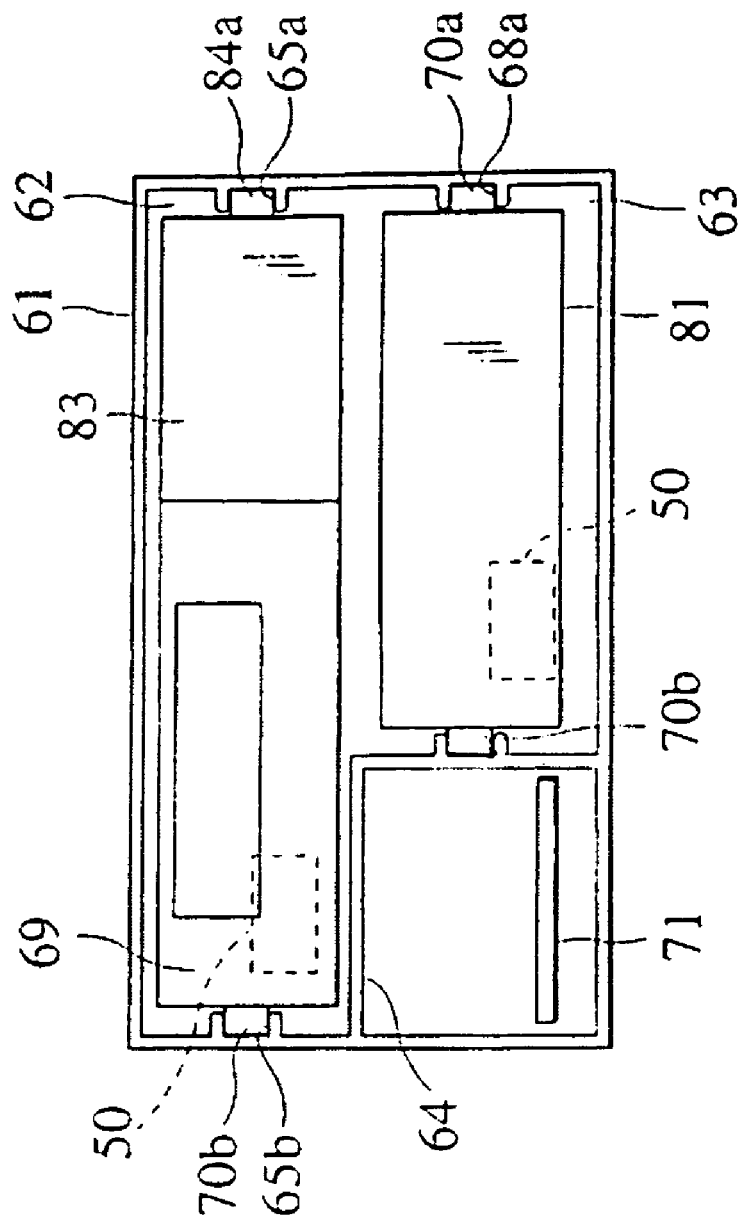

AUDIO RACK FOR A VEHICLE

This is a continuation of application Ser. No. 09/366,722, filed Aug. 4,1999, which is incorporated herein by reference.

BACKGROUND OF THE INVENTION

1. Field of the Invention

The present invention relates to audio rack for a vehicle, into which a plurality of pieces of electrical equipment are removably installed.

2. Description of the Related Art

In art related to the present invention, a plurality of pieces of audio equipment are installed in a center cluster module at the front part of a vehicle.

SUMMARY OF THE INVENTION

Pieces of electrical equipment that have different functions often have diverse shapes and dimensions. For example, there are items such as a CD drive, which has a large width and small height, and cassette or MD (Mini Disc) drives, which have a small width but a large height. To accommodate such equipment, there are standards, such as DIN (Deutsch Industrie Norm), for the center cluster module storage area for this equipment, which set forth specifications for size and shape. In general, each of the storage locations is established to have the same size and shape. For this reason, when a CD drive is inserted, there is considerable wasted space in the width direction.

Accordingly, it is an object of the present invention to provide an audio rack for a vehicle which makes effective use of storage space for electrical equipment.

To achieve the above-noted object, an audio rack according to the present invention has a first storage location and a second storage location. The first storage location accepts a first piece of electrical equipment that has a first width size, and the second storage location is located either above or below the first storage location, and accepts a second piece of electrical equipment, which has a second width that is smaller than the first width size.

By adopting the above-noted arrangement, because the first and second storage locations have widths to accommodate pieces of electrical equipment that are mutually different in width, not only is it possible to make effective use of the storage space within the audio rack, but also the audio rack features expandability.

The audio rack of the present invention can further have a controller and a connection unit. The controller is located in the space within the audio rack that is not occupied by the first and second storage locations. The connection unit provides electrical connections between the first electrical equipment that is housed in the first storage location and the controller, and between the second electrical equipment that is housed in the second storage location and the controller. The controller performs control of the first and second electrical equipment via the connection unit.

According to the above-noted arrangement, because the controller is located in the space within the audio rack that is not occupied by the first and second storage locations, it is possible to make effective use of the space within the audio rack.

The connection unit can further have a first connector, which is connected to the first electrical equipment in the first storage location and a second connector, which is connected to the second electrical equipment in the second storage location.

The first and second connectors can be fixed with respect to the audio rack. The first connector can be electrically connected to a connector of the first electrical equipment by the action of inserting the first electrical equipment into the first storage location, and the second connector can be electrically connected to a connector of the second electrical equipment by the action of inserting the second electrical equipment into the second storage location.

The audio rack can further have a pair of first guides and a pair of second guides. The first guides are provided on inner surfaces at the left and right sides of the first storage locations, and slidably support the first electrical equipment. The second guides are provided on inner surfaces at the left and right sides of the second storage locations, and slidably support the second electrical equipment. The first guides guide the insertion of the first electrical equipment into the first storage location, and establish the position of the first electrical equipment in the width and height directions. The second guides guide the insertion of the second electrical equipment into the second storage location, and establish the position of the second electrical equipment in the width and height directions. The first and second connectors can have substantially the same shape. The distance between one of the first guides and the first connector in the width direction can be made equal to the distance between one of the second guides on the same side of thereof as the one guide of the first guides and the second connector in the width direction. The distance in the height direction from the above-noted one first guide and the first connector can be made equal to the distance in the height direction from the above-noted one second guide and the second connector.

The above-noted audio rack can further have a spacer that is removably fixed with respect to the second electrical equipment at either the right or left side thereof. When a second electrical equipment, which is provided with a spacer, is inserted into the first storage location, it is slidably supported by the above-noted one first guide, with the other first guide slidably supporting the spacer. As the second piece of electrical equipment, which has the spacer, is inserted into the first storage location, the first connector makes an electrical connection with the above-noted connector on the second electrical equipment.

According to the above-noted arrangement, it is possible to install the second electrical equipment in the first storage location the same manner in which the first electrical equipment is installed therein.

The above-noted audio rack can further have a spacer that is removably fixed with respect to a third piece of electrical equipment that has a third width size that is smaller than the first width size, at either the right or left side thereof. When a third electrical equipment, which is provided with this spacer, is inserted into the first storage location, it is slidably supported by the above-noted one first guide, with the other first guide slidably supporting the spacer thereof. As the third piece of electrical equipment, which has the spacer, is inserted into the first storage location, the first connector makes an electrical connection with the above-noted connector on the third electrical equipment.

According to the above-noted arrangement, it is possible to install the third electrical equipment, which has the third width size, in the first storage location the same manner in which the first electrical equipment is installed therein.

The first guides can have grooves that can mate with protrusions on the first electrical equipment, and the second guides can have grooves that can mate with protrusions on the second electrical equipment.

The first storage location can be made to accept a first electrical equipment that has a first height size, and the second storage location can be made to accept a second electrical equipment, which has a height size that is larger than the first height size.

BRIEF DESCRIPTION OF THE DRAWINGS

FIG. 8 is a front view showing the audio rack in the condition in which a second electrical equipment is inserted into the first storage location.

DESCRIPTION OF THE PREFERRED EMBODIMENTS

Preferred embodiments of an audio rack according to the present invention are described in detail below, with reference to relevant accompanying drawings.

Figure 1:
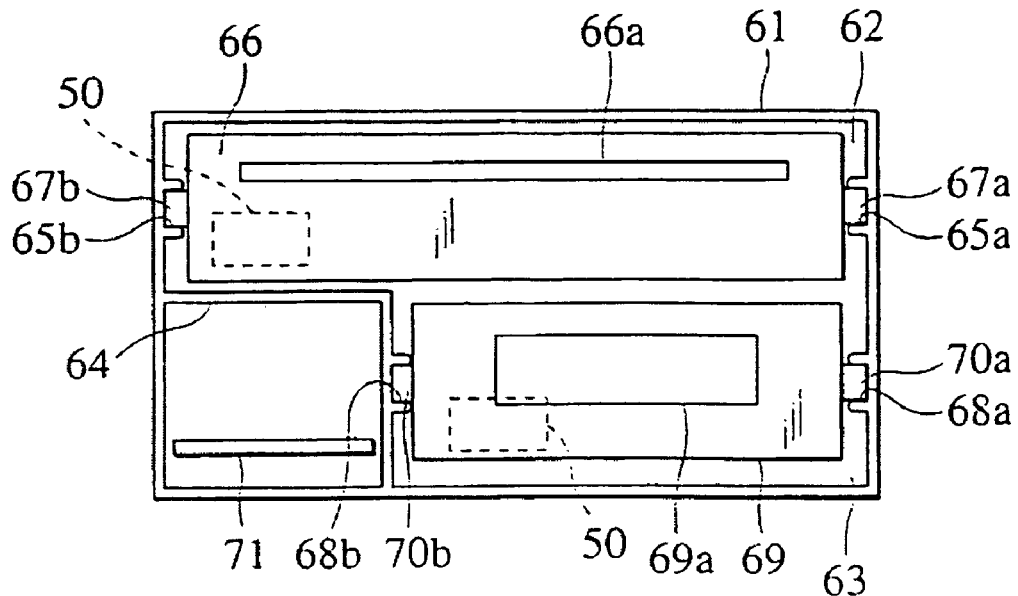
FIG. 1 is a front view of an audio rack into which are inserted a plurality of pieces of electrical equipment.
Figure 4:
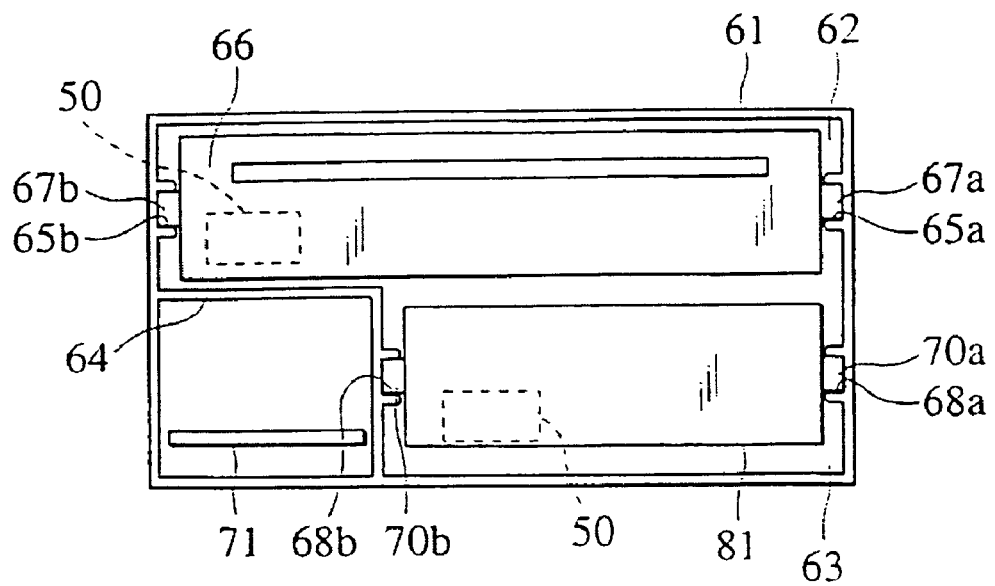
FIG. 4 is a front view that show the audio rack in the condition in which a different piece of electrical equipment has been installed in the second storage location.
Figure 5:
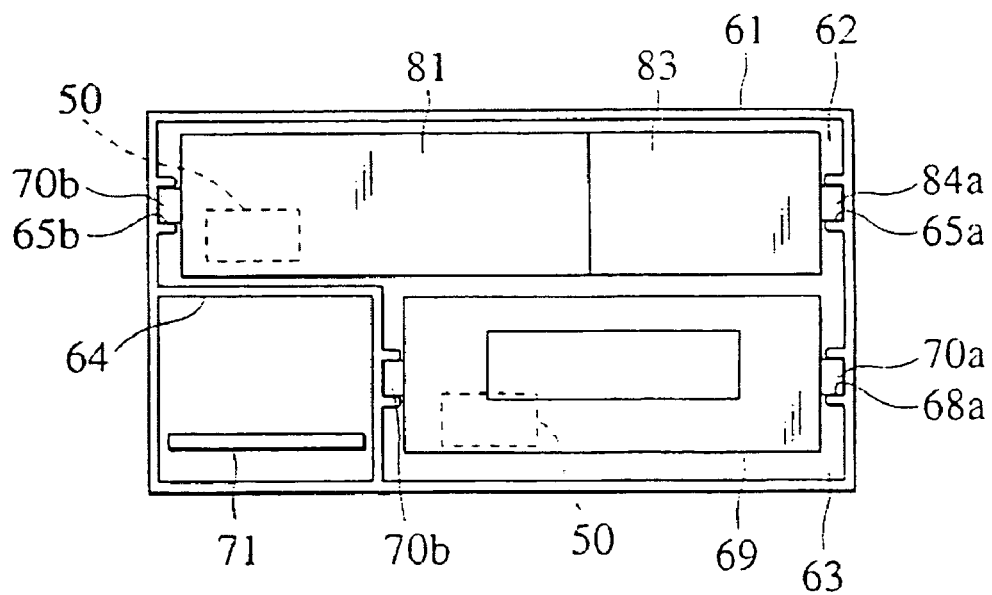
FIG. 5 is a front view that shows the audio rack in the condition in which yet a different piece of electrical equipment has been installed in the second storage location.

As shown in FIG. 1, FIG. 4, and FIG. 5, a vehicular audio rack 61 for the purpose of removably installing a plurality of pieces of electrical equipment 66, 69, and 81 has a fixed width size and a fixed height size, these fixed width and height sizes being set forth as DIN standards.

The vehicular audio rack 61 has a first storage location 62 at the top, and a second storage location 63 at the bottom. The inside part of the audio rack 61 at the lower left part thereof is divided by a dividing wall 64, the second storage location being disposed to the right side of this dividing wall 64.

The first storage location 62 can have inserted into it a piece of electrical equipment (the first electrical equipment) 66, such as a CD drive, which has a first width size that is substantially the same as the above-noted fixed width size and a first height size that is substantially the same as the above-noted fixed height size. The left and right inner surfaces of the first storage location 66 have linear guide grooves (first guides) 65a and 65b formed therein.

On the front surface of the electrical equipment 66, there is formed a medium insertion port 66a, for the purpose of inserting a CD or the like thereinto. On the right and left side surfaces of the electrical equipment 66 are formed rails (protrusions) 67a and 67b, which mate with the guide grooves 65a and 65b. By the action of the rails 67a and 67b sliding in the guide grooves 65a and 65b, the electrical equipment 66 is guided into the first storage location 62.

The second storage location 63 can have inserted into it a piece of electrical equipment (the second electrical equipment) 69, such as an MD drive, which has a second width size that is smaller than the above-noted fixed width size and a second height size that is larger than the above-noted fixed height size. The left and right inner surfaces of the second storage location 63 have linear guide grooves (second guides) 68a and 68b formed therein.

On the front surface of the electrical equipment 69, there is formed a medium insertion port 69a, for the purpose of inserting a cassette or the like thereinto. On the right and left side surfaces of the electrical equipment 69 are formed rails (protrusions) 70a and 70b, which mate with the guide grooves 68a and 68b. By the action of the rails 70a and 70b sliding in the guide grooves 68a and 68b, the electrical equipment 69 is guided into the second storage location 63.

The second storage location 63 can be located above the first storage location 62.

A control board (controller) 71 for the purpose of controlling the electrical equipment 66 and 69 that are housed in the storage locations 62 and 63 is disposed inside the dividing wall 64, which is the space other than that occupied by the first storage location 62 and the second storage location 63.

As described above, because the audio rack according to the present invention has first and second storage locations 62 an 63 with width sizes that accommodate electrical equipment 66 and 69, which have different widths, it is not only possible to make effective use of the space within the audio rack 61, but also the expandability of the audio rack 61 is enhanced. Additionally, because the control board 71 is disposed within the dividing wall 64, it is possible to maximum the effective use of the space within the audio rack 61.

Figure 3:
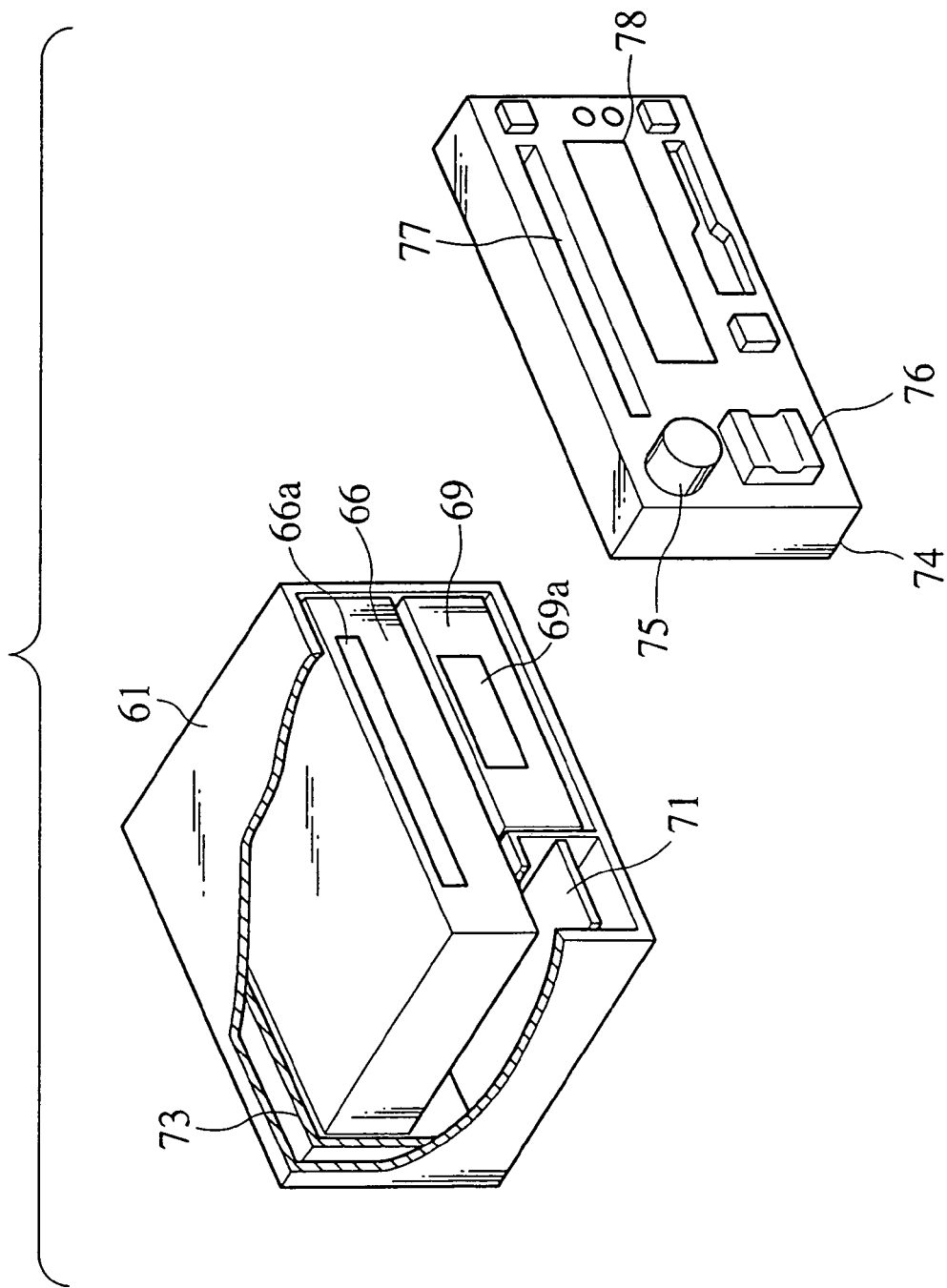
FIG. 3 is a perspective view that shows the condition in which the operating panel has been removed from the audio rack.

As shown in FIG. 3, a bus board 73 is disposed at the rear side of the electrical equipment 66 and 69 in the audio rack 61, and the control board 71 is electrically connected to this bus board 73.

Figure 2:
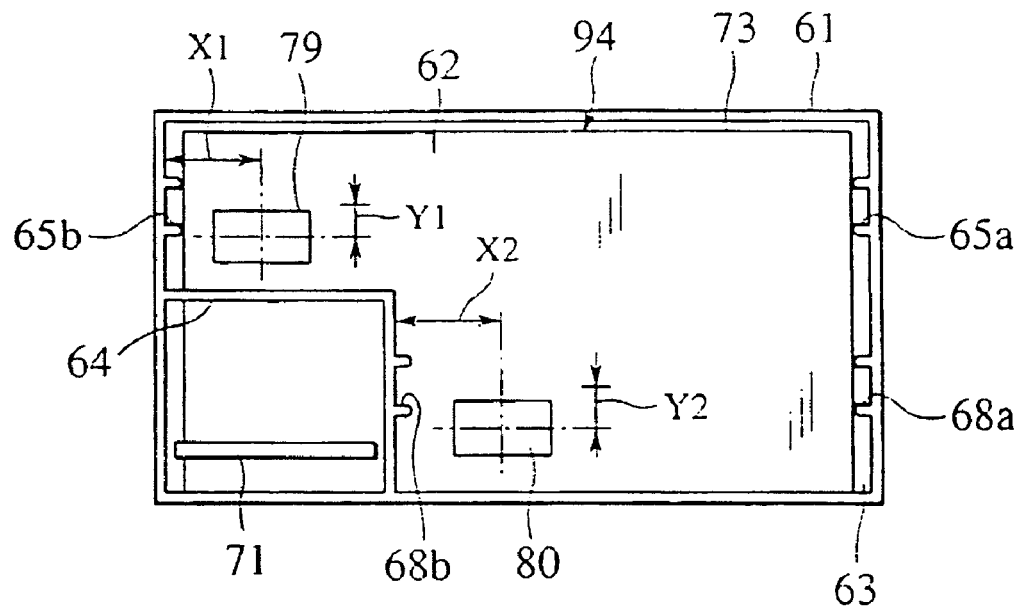
FIG. 2 is a front view of an audio rack from which the electrical equipment has been removed.

As shown in FIG. 2, receiving connectors 79 and 80 (shown in FIG. 2) protrude toward the first and second storage locations 62 and 63 from the bus board 73. The receiving connector 79 is removed by X1 in the right side in the width direction from the upper left guide groove 65b as a reference, and is removed by Y1 therefrom in the downward height direction. The receiving connector 80 is removed by X2 in the right side in the width direction from the lower left guide groove 68b as a reference, and by Y2 therefrom in the in the downward height direction. The dimensions X1 and X2 are established as the same, and the dimensions Y1 and Y2 are established as the same.

The receiving connectors 79 and 80 and the bus board 73 form the connection unit 94.

When the rails 67a and 67b are slid into the guide grooves 65a and 65b so as to insert the electrical equipment 66 into the first storage location 62, the connector 50, which protrudes from the rear surface of the electrical equipment 66 automatically makes connection with the receiving connector 79. By means of this action, the electrical equipment 66 within the first storage location 62 is electrically connected to the control board 71 via the receiving connector 79 and the bus board 73.

In the same manner, when the rails 70a and 70b are slid into the guide grooves 68a and 68b so as to insert the electrical equipment 69 into the second storage location 63, the connector 50, which protrudes form the rear surface of the electrical equipment 69 automatically makes connection with the receiving connector 80. By means of this action, the electrical equipment 69 within the second storage location 63 is electronically connected to the control board 71 via the receiving connector 80 and the bus board 73.

Each of the connectors 50 are disposed in positions that correspond with the receiving connectors 79 and 80.

As shown in FIG. 3, an operating panel 74 for the purpose of operating the electrical equipment within the audio rack 61 is removably mounted to from surface of the vehicular audio rack 61. The operating panel 74 has operating switches 75 and 76, and medium insertion ports 77 and 78, which correspond to the positions of the medium insertion ports 66a and 69a on the electrical equipment 66 and 69.

By removing the operating panel 74 form the vehicular audio rack 61, the first and second electrical equipment 62 and 63 can be replaced by other electrical equipment.

FIG. 4 shows the case in which pieces of electrical equipment (the first and third electrical equipment) 81 having the above-noted second width size and the above-noted first height size are inserted into the second storage location 63. An example of this electrical equipment 81 is a radio amplifier. Of the elements that make up the electrical equipment 81, elements that are in common with the electrical equipment 69 have been assigned the same reference numerals, and will not be described herein.

In the above-noted case, when the rails 70a and 70b are slid in the guide grooves 68a and 68b so that the electrical equipment 81 is inserted into the second storage location 63, the connector 50, which protrudes from the rear surface of the electrical equipment 81 automatically makes connection with the receiving connector 80. By means of this action, the electrical equipment 81 within the second storage location 63 is electrically connected to the control board 71 via the receiving connector 80 and the bus board 73.

Figure 6:
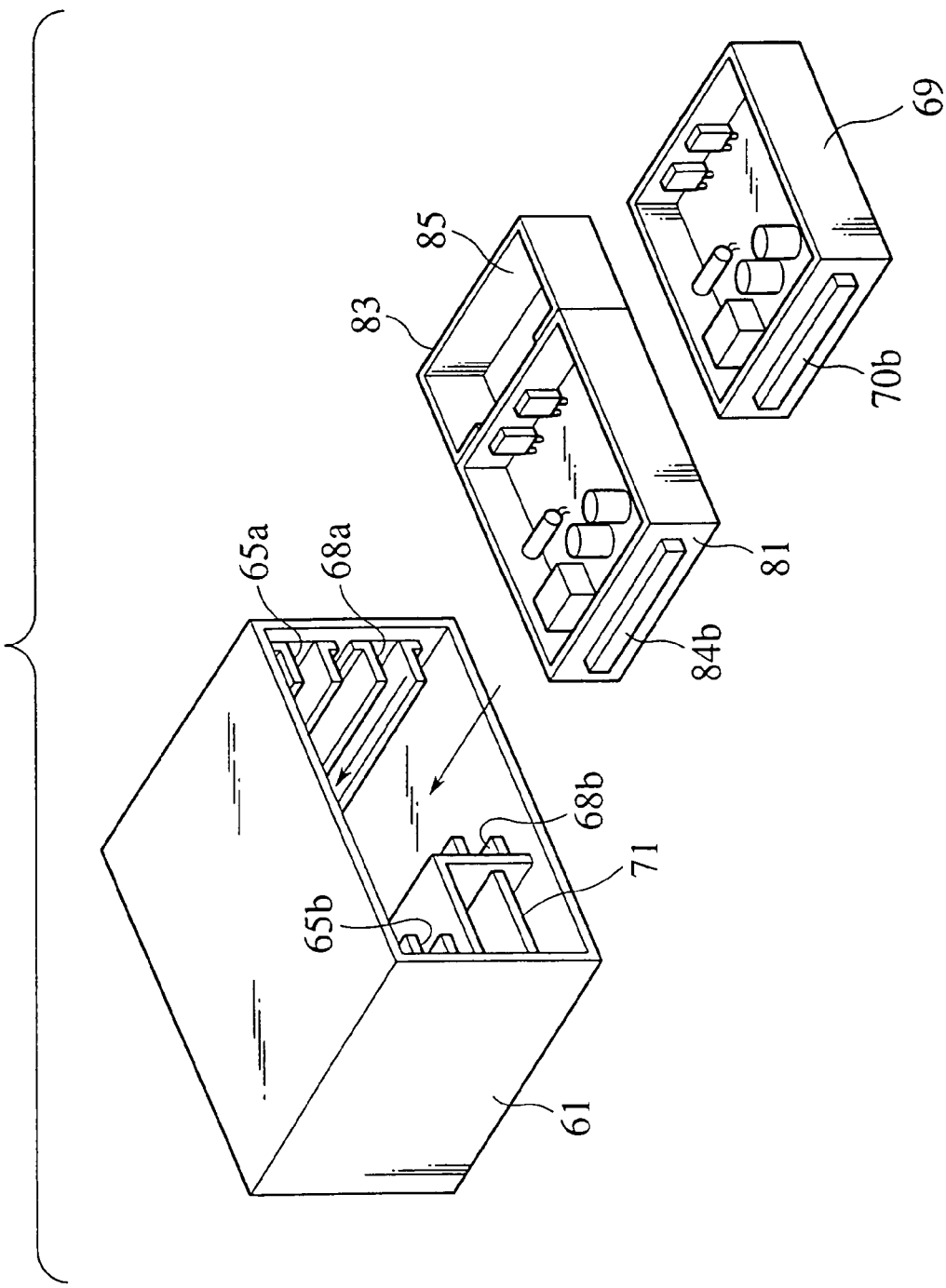
FIG. 6 is a exploded perspective view of FIG. 5.
Figure 7:
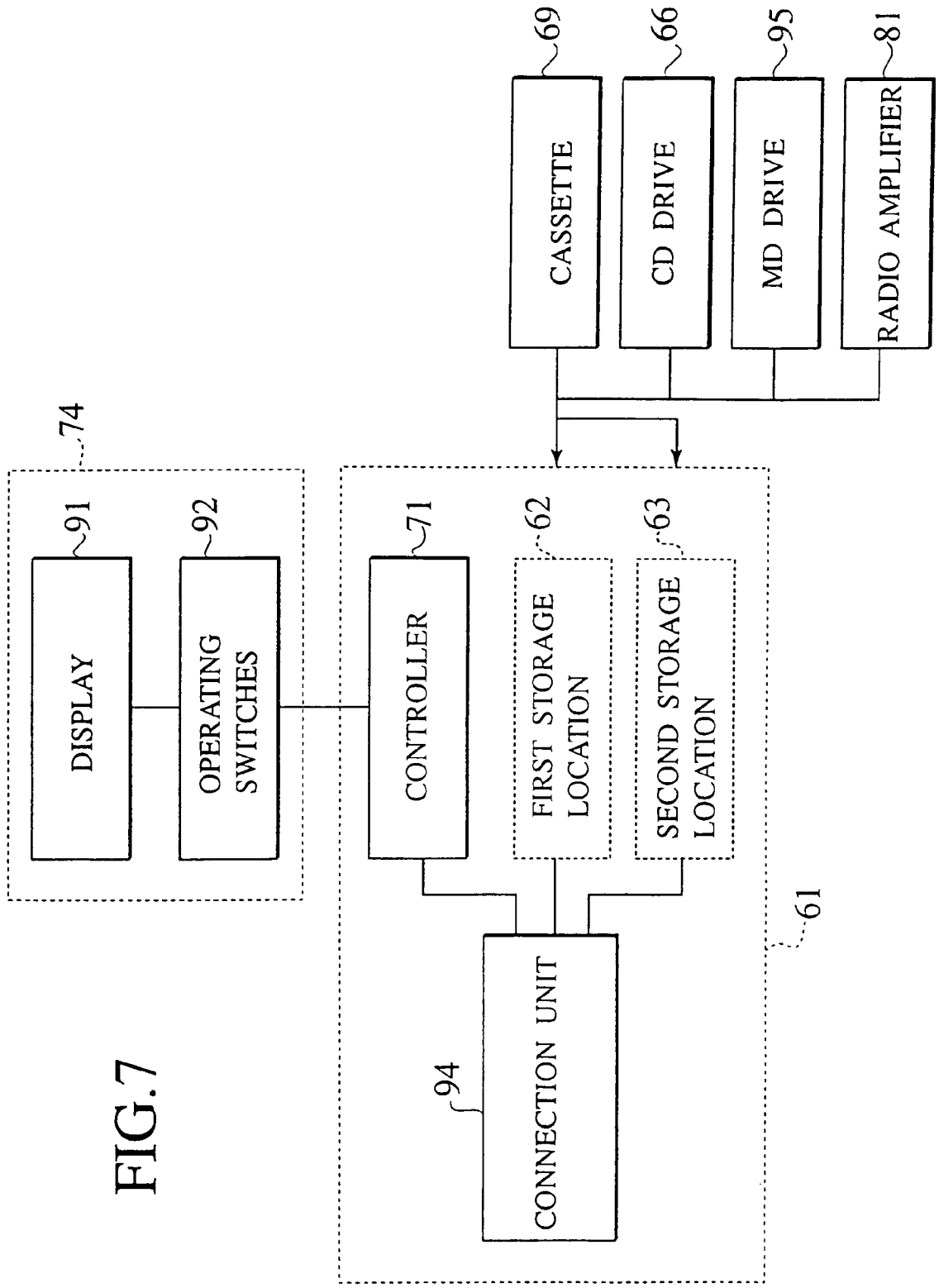
FIG. 7 is a block diagram that shows the configuration of the audio panel, electrical equipment, and operating panel.

FIG. 5 and FIG. 6 show the cases in which, because the width size of the electrical equipment 81 is not suitable for the first storage location 62, a mounting stay (spacer) having cavity 85 therein is mounted to the right side of the electrical equipment 81.

The total width size of the second width size of the electrical equipment 81 and the width size of the mounting stay 83 is established so as to be equal to the first width size. On the right side of the mounting stay 83 is formed a rail (a protrusion) 84a that mates with the guide groove 65a. By the rail 84a and the rail 70b on the left side of the electrical equipment 81 sliding in the guide grooves 65a and 65b, the electrical equipment 81 is guided into the first storage location 62.

Because the electrical equipment 81 can be selectively inserted into the upper first storage location 62 or the lower second storage location 63, there is an increase in the electrical equipment from which the user can select. Therefore, a vehicular audio rack is provided that has good expandability. In this case, the mounting stay 83 can be used to mount other electrical equipment for expansions, such as a radio with a visual display.

As shown in FIG. 8, the above-noted audio rack 61 can further have a spacer 83 that is removably fixed with respect to the second electrical equipment 69 at either the right or left side thereof. When a second electrical equipment 69, which is provided with a spacer 83, is inserted into the first storage location 62, it is slidably supported by the above-noted one first guide, with the other first guide slidably supporting the spacer 83. As the second electrical equipment 69, which has the spacer 83, is inserted into the first storage location 62, the first connector 79 makes an electrical connection with the above-noted connector 50 on the second electrical equipment 69.

The operating panel 74 has a display 91 and operating switches 92 (75 and 76 as shown in FIG. 3), the user operating these switches 92 so as to cause a operating signals to be output to the controller 71.

The controller 71 controls the electrical equipment that is housed in the storage locations 62 or 63, via the connection unit 94, and in accordance with operating signals.

It should be noted that the present invention is not restricted in application to the vehicular audio rack noted in the foregoing embodiment. Additionally, while in the embodiment there were two storage locations, positioned one above the other, in the case in which pieces of electrical equipment having quite a small height is to be installed, a vertically stacked three-level arrangement can also be used.

Note also that there is no restriction in the present invention to type of electrical equipment noted in the embodiment, and other types of electrical equipment can be used as well. In addition, it will be understood that other variations of the present invention are possible within the technological scope of the present invention.

What is claimed is:

1. An audio rack for a vehicle into which a plurality of electrical equipment is removably installable, comprising:
a first storage location having a first width defined by two first side surfaces for accepting a first electrical equipment having a first width size;
a second storage location for accepting a second electrical equipment having a second width size that is different from the first width size, the second storage location having a second width defined by two second side surfaces, the second width being smaller than the first width of the first storage location;
a controller that is disposed in the space at a side of the second storage location within the audio rack that is not occupied by the first and second storage locations; and
a connection unit, which makes an electrical connection between the first electrical equipment in the first storage location and the controller, and an electrical connection between the second electrical equipment in the second storage location and the controller,
wherein the controller controls the first and second electrical equipments via the connection unit.

2. An audio rack according to claim 1, wherein the connection unit comprises a first connector that is connected to the first electrical equipment in the first storage location and a second connector that is connected to the second electrical equipment in the second storage location.

3. An audio rack according to claim 2, wherein the first connector is fixed within the audio rack, and makes electrical connection with a connector of the first electrical equipment by the action of the first electrical equipment being inserted into the first storage location, and wherein the second connector is fixed within the audio rack, and makes electrical connection with a connector of the second electrical equipment by the action of the second electrical equipment being inserted into the second storage location.

4. An audio rack according to claim 3, further comprising:
a first guide, which is provided on an inner surface of the first storage location, and which slidably supports the first electrical equipment; and
a second guide, which is provided on an inner surface of the second storage location, and which slidably supports the second electrical equipment, wherein
the first guide guides the insertion of the first electrical equipment into the first storage location, and also establishes the position of the first electrical equipment within the first storage location in the width direction and in the height direction,
the second guide guides the insertion of the second electrical equipment into the second storage location, and also establishes the position of the second electrical equipment within the second storage location in the width direction and the height direction, the first connector and the second connector have substantially the same shape, the distance in the width direction between one of the first guides and the first connector in the width direction is equal to the distance between one of the second guides on the same side of thereof as the one guide of the first guides and the second connector, and the distance in the height direction from the one first guide and the first connector can be made equal to the distance in the height direction from the one second guide and the second connector.

5. An audio rack according to claim 4, further comprising:
a spacer, which is removably fixed with respect to the second electrical equipment on either the right side or the left side thereof, wherein when the second electrical equipment, which is provided with the spacer, is inserted into the first storage location, it is slidably supported by the one first guide, with the other first guide slidably supporting the spacer, and further wherein with the action of inserting the second electrical equipment into the first storage location, an electrical connection is made between the first connector and the connector of the second electrical equipment.

6. An audio rack according to claim 4, further comprising:
a spacer, which is removably fixed with respect to a third electrical equipment on either the right side or the left side thereof, the third electrical equipment having a width smaller than the width of the first storage location, wherein when the third electrical equipment, which is provided with the spacer, is inserted into the first storage location, it is slidably supported by the one first guide, with the other first guide slidably supporting the spacer, and further wherein with the action of inserting the third electrical equipment into the first storage location, an electrical connection is made between the first connector and a connector of the third electrical equipment.

7. An audio rack according to claim 4, wherein
the first guide is shaped as a groove, which can mate with a protrusion on the first electrical equipment, and the second guide is shaped as a groove, which can mate with a protrusion on the second electrical equipment.

8. An audio rack of a vehicle configured to receive a plurality of electrical equipments, comprising:
a first storage space of the audio rack having a first width defined by two first side surfaces and configured to receive a first electrical equipment having a width slightly less than the first width;

a second storage space of the audio rack having a second width defined by two second side surfaces, the second width being smaller than the first width and configured to receive a second electrical equipment having a width slightly less than the second width; and each of the first width and the second width being uniform along the depth of the respective storage space, wherein one of the first and second storage spaces is disposed on the top of the other.

9. An audio rack according to claim 8, further comprising:
a third storage space located adjacent to the second storage space in the width direction.

10. An audio rack according to claim 9, further comprising:
a controller disposed in the third storage space; and a connection unit having a first electrical connector connecting between the first electrical equipment and the controller and a second electrical connector connecting between the second electrical equipment and the controller, wherein the controller controls the first and second electrical equipments via the connection unit.

11. An audio rack according to claim 10, wherein:
the first electrical connector is disposed within the first storage space and configured to electrically connect with the first electrical equipment when the first electrical equipment is inserted into the first storage space; and the second electrical connector is disposed within the second storage space and configured to electrically connect with the second electrical equipment when the second electrical equipment is inserted into the second storage space.

12. An audio rack according to claim 11, wherein:
the first storage space includes a first pair of guides, each of the first pair of guides being disposed on each of the two first side surfaces for slidably supporting the first electrical equipment within the first storage space and for guiding the insertion of the first electrical equipment into the first storage space so as to position the first electrical equipment in a desired position within the audio rack; and the second storage space includes a second pair of guides, each of the second pair of guides being disposed on each of the two second side surfaces for slidably supporting the second electrical equipment within the second storage space and for guiding the insertion of the second electrical equipment into the second storage space so as to position the second electrical equipment in a desired position within the audio rack.

13. An audio rack according to claim 12,
wherein a distance between one of the first pair of guides the first electrical connector in the direction is equal to a distance between one of the second pair of guides and the second electrical connector in the width direction.

14. An audio rack according to claim 13, further comprising a spacer removably attachable to a top or side surface of the second electrical equipment, wherein:
the second electrical equipment having the spacer attached is insertable into the first storage space;

one of the first pair of guides slidably supports one side of the second electrical equipment and the other of the first pair of guides slidably supports one side of the spacer; and the first electrical connector is disposed within the first storage space such that the first electrical connector electrically connects with the second electrical equipment when the second electrical equipment is inserted into the first storage space.

15. An audio rack according to claim 13, further comprising a spacer removably attachable to a top or side surface of a third electrical equipment, wherein:
the third electrical equipment having the spacer attached is insertable into the first storage space;

one of the first pair of guides slidably supports one side of the third electrical equipment and the other of the first pair of guides slidably supports one side of the spacer; and the first electrical connector is disposed within the first storage space such that the first electrical connector electrically connects with the third electrical equipment when the third electrical equipment is inserted into the first storage space.

16. An audio rack according to claim 13, wherein each of the first and second pair of guides includes a groove configured to mate with a protrusion formed on each of the first and second electrical equipments.

17. An audio rack according to claim 12,
wherein a distance between one of the first pair of guides and the first electrical connector in the height direction is equal to a distance between one of the second pair of guides and the second electrical connector in the height direction.

18. An audio rack according to claim 8, wherein at least one of the first and second storage spaces includes a pair of guides disposed on the respective first or second side surfaces for guiding at least one of the first and second electrical equipments into the respective one of the first and second storage spaces, so as to position at least one of the first and second electrical equipments in desired positions within the audio rack.

19. An audio rack according to claim 9, wherein:
the first storage space has a first height configured to receive the first electrical equipment having a height slightly less than the first height; and
a second storage space has a second height larger than the first height and configured to receive a second electrical equipment having a height slightly less than the second height.

20. An audio rack of a vehicle configured to receive a plurality of electrical equipments, comprising:
a first storage space of the audio rack having a first width defined by two first side surfaces and configured to receive a first electrical equipment having a width slightly less than the first width;
a second storage space of the audio rack having a second width defined by two second side surfaces, the second width being smaller than the first width and configured to receive a second electrical equipment having a width slightly less than the second width; and
a third storage space located adjacent to the second storage space in the width direction,
wherein one of the first and second storage spaces is disposed on the top of the other, and
wherein at least one of the first and second storage spaces includes a pair of guides disposed on the respective first or second side surfaces for guiding at least one of the first and second electrical equipments into the respective one of the first and second storage spaces, so as to position at least one of the first and second electrical equipments in desired positions within the audio rack.

* * * * *

UNITED STATES PATENT AND TRADEMARK OFFICE
CERTIFICATE OF CORRECTION

PATENT NO. : 6,989,993 B2
DATED : January 24, 2006
INVENTOR(S) : Takeyuki Amari et al.

It is certified that error appears in the above-identified patent and that said Letters Patent is hereby corrected as shown below:

<u>Column 8,</u>
Lines 41-42, "guides the" should read -- guides and the --.
Line 42, "the direction" should read -- the width direction --.

Signed and Sealed this

Eleventh Day of April, 2006

JON W. DUDAS
*Director of the United States Patent and Trademark Office*